US007249012B2

(12) United States Patent
Moore

(10) Patent No.: US 7,249,012 B2
(45) Date of Patent: Jul. 24, 2007

(54) STATISTICAL METHOD AND APPARATUS FOR LEARNING TRANSLATION RELATIONSHIPS AMONG PHRASES

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/300,309

(22) Filed: Nov. 20, 2002

(65) Prior Publication Data

US 2004/0098247 A1  May 20, 2004

(51) Int. Cl.
*G06F 17/28* (2006.01)
(52) U.S. Cl. ............................... 704/4; 704/2
(58) Field of Classification Search ............ 704/2, 704/9, 10, 4
See application file for complete search history.

(56) References Cited

U.S. PATENT DOCUMENTS

| | | | | |
|---|---|---|---|---|
| 4,800,522 A * | 1/1989 | Miyao et al. | | 704/2 |
| 4,914,590 A | 4/1990 | Loatman et al. | | 704/8 |
| 5,128,865 A * | 7/1992 | Sadler | | 704/2 |
| 5,267,156 A * | 11/1993 | Nomiyama | | 704/10 |
| 5,386,556 A | 1/1995 | Hedin et al. | | 707/4 |
| 5,418,717 A * | 5/1995 | Su et al. | | 704/9 |
| 5,541,836 A | 7/1996 | Church et al. | | 704/7 |
| 5,867,811 A * | 2/1999 | O'Donoghue | | 704/1 |
| 5,907,821 A * | 5/1999 | Kaji et al. | | 704/4 |
| 6,041,293 A * | 3/2000 | Shibata et al. | | 704/4 |
| 6,092,034 A * | 7/2000 | McCarley et al. | | 704/2 |
| 6,236,958 B1 * | 5/2001 | Lange et al. | | 704/8 |
| 6,804,637 B1 * | 10/2004 | Tokuda et al. | | 704/2 |
| 7,020,601 B1 * | 3/2006 | Hummel et al. | | 704/2 |
| 7,107,204 B1 * | 9/2006 | Liu et al. | | 704/2 |
| 2002/0107683 A1 * | 8/2002 | Eisele | | 704/2 |
| 2003/0023423 A1 * | 1/2003 | Yamada et al. | | 704/2 |
| 2003/0204400 A1 * | 10/2003 | Marcu et al. | | 704/251 |

OTHER PUBLICATIONS

Lars Ahrenberg, Mikael Anderson, Magnus Merkel, "A Simple Hybrid Aligner for Generating Lexical Correspondences in Parallel Texts", Proceedings of COLING '98/ACL '98.*
Mihoko Kitamura, Yuji Matsumoto, "Automatic Extraction of Word Sequence Correspondences in Parallel Corpora", Proceedings of the Fourth Annual Workshop on Very Large Corpora, pp. 79-87, 1996.*
I. Dan Melamed, "A Word-to-Word Model of Translational Equivalence", Proceedings of the 35th Conference of the Association for Computational Linguistics, pp. 490-497, 1997.*

(Continued)

*Primary Examiner*—Tālivaldis Ivars Šmits
*Assistant Examiner*—Eric Yen
(74) *Attorney, Agent, or Firm*—Joseph R. Kelly; Westman, Champlin & Kelly, P.A.

(57) ABSTRACT

The present invention learns phrase translation relationships by receiving a parallel aligned corpus with phrases to be learned identified in a source language. Candidate phrases in a target language are generated and an inside score is calculated based on word association scores for words inside the source language phrase and candidate phrase. An outside score is calculated based on word association scores for words outside the source language phrase and candidate phrase. The inside and outside scores are combined to obtain a joint score.

28 Claims, 12 Drawing Sheets

OTHER PUBLICATIONS

Pascale Fung, Kenneth Ward Church, "K-Vec: a New Approach for Aligning Parallel Texts", Proceedings from the 15th International on Computational Linguistics, pp. 1096-1102, 1994.*

Robert C. Moore, "Learning Translations of Named-Entity Phrases from Parallel Corpora", Microsoft Research.*

Dekai Wu, "Aligning a Parallel English-Chinese Corpus Statistically with Lexical Criteria", Proceedings of the 32nd annual meeting on Association for Computational Linguistics, pp. 80-87, 1994.*

Stanley F. Chen, "Aligning Sentences in Bilingual Corpora Using Lexical Information", Proceedings of the 31st annual meeting on Association for Computational Linguistics, pp. 9-16, 1993.*

William A. Gale, Kenneth W. Church, "A Program for Aligning Sentences in Bilingual Corpora", 1993, Association for Computational Linguistics.*

Peter F. Brown, Jennifer C. Lai, Robert L. Mercer, "Aligning Sentences in Parallel Corpora", Proceedings of the 29th annual meeting on Association for Computational Linguistics, pp. 169-176, 1991.*

Ido Dagan, Kenneth W. Church, William A. Gale, "Robust Bilingual Word Alignment for Machine Aided Translation", In Proceedings of the Workshop on Very Large Corpora: Academic and Industrial Perspectives, pp. 1-8, 1993.*

I. Dan Melamed, "Automatic Evaluation and Uniform Filter Cascades for Inducing N-Best Translation Lexicons", Proceedings of the Third Workshop on Very Large Corpora, pp. 184-198, 1995.*

Dragos Stefan Munteanu, Daniel Marcu, U.S. Appl. No. 60/368,070, filed Mar. 26, 2002.*

Reinhard Rapp, "Automatic Identification of Word Translations from Unrelated English and German Corpora", ACL, 1999.*

Timothy Meekhof, David Clements, "L&H Lexicography Toolkit for Machine Translation", AMTA 2000.*

Pascale Fung, Lo Yuen Yee, "An IR Approach for Translating New Words from Nonparallel, Comparable Texts", ACL 1998.*

William A. Gale, Kenneth W. Church, David Yarowsky, "A Method for Disambiguating Word Senses in a Large Corpus", AT&T, Kluwer Academic Publishers, 1993.*

Phillip Koehn, Kevin Knight, U.S. Appl. No. 60/368,447, filed Mar. 27, 2002.*

Mona Diab, Steve Finch, "A Statistical Word-level Translation Model for Comparable Corpora", Proceedings of the Conference on Content-Based Multimedia Information Access (RIAO), 2000.*

Y. Al-Onaizan and K. Knight. 2002. Named entity translation: extended abstract. In advance papers of Human Language Technology 2002, San Diego, CA. pp. 111-115.

N. Chinchor. 1997. MUC-7 named entity task definition. In Proceedings of the 7th Message Understanding Conference.

I. Dagan and K. Church. 1997. Termight: coordinating humans and machines in bilingual terminology acquisition. Machine Translation, 12:89-107.

T. Dunning. 1993. Accurate methods for the statistics of surprise and coincidence. Computational Linguistics, 19(1) :61-74.

J. Kupiec. 1993. An algorithm for finding noun phrase correspondences in bilingual corpora. In Proceedings of the 31st Annual Meeting of the Association for Computational Linguistics. Columbus Ohio, pp. 17-22.

I.D. Melamed. 1997. Automatic discovery of non-compositional compounds in parallel data. In Proceedings of the 2nd Conference on Empirical Methods in Natural Language Processing *EMNLP '97), Providence RI.

I.D. Melamed. 2000. Models of Transitional Equivalence. Computational Linguistics, 26(2) :221-249.

R. C. Moore. 2001. Towards a simple and accurate statistical approach to learning translation relationships among words. In Proceedings of the Workshop on Data-Driven Machine Translation, 39th Annual Meeting of the Association for Computational Linguistics, Toulouse, France, pp. 79-86.

S. Richardson, W.B. Dolan, M. Corston-Oliver and A. Menezes. 2001. Overcoming the customization bottleneck using example-based MT. In Proceedings of the Workshop on Data-Driven Machine Translation, 39th Annual Meeting of the Association for Computational Linguistics, Toulouse, France, pp. 9-16.

F. Smadja, K.R. McKeown, and V. Hatzivassiloglou. 1996. Translating collocations for bilingual lexicons: a statistical approach. Computational Linguistics, 22(1) :1-38.

D. Wu. 1995. Grammarless extraction of phrasal translation examples from parallel texts. In Proceedings of TMI-95, Sixth International Conference on Theoretical and Methodological Issues in Machine Translation, Leuven, Belgium, vol. 2, pp. 354-372.

K. Yamamoto, Y. Matsumoto and M. Kitamura. 2001. A comparative study on translational units for bilingual lexicon extraction. In Proceedings of the Workshop on Data-Driven Machine Translation, 39th Annual Meeting of the Association for Computational Linguistics, Toulouse, France, pp. 87-94.

* cited by examiner

STATISTICAL METHOD AND APPARATUS FOR LEARNING TRANSLATION RELATIONSHIPS AMONG PHRASES

Reference is hereby made to related U.S. patent application Ser. No. 10/173,252, entitled STATISTICAL METHOD AND APPARATUS FOR LEARNING TRANSLATION RELATIONSHIPS AMONG WORDS and filed on Jun. 17, 2002.

BACKGROUND OF THE INVENTION

The present invention relates to learning relationships among phrases. More specifically, the present invention relates to a statistical approach for learning translation relationships among phrases in different languages.

Machine translation systems are systems that receive a textual input in one language, translate it to a second language, and provide a textual output in the second language. In doing this, such systems typically use a translation lexicon to obtain correspondences, or translation relationships, between content words which are obtained during training.

A common approach to deriving translation lexicons from empirical data involves choosing a measure of a degree of association between words in a first language, L1, and words in a second language, L2, in aligned sentences of a parallel bilingual corpus. Word pairs (consisting of a word from L1 and a word from L2) are then ordered by rank according to the measure of association chosen. A threshold is chosen and the translation lexicon is formed of all pairs of words whose degree of association is above the threshold.

For example, in one prior art approach, the similarity metric (the measure of degree of association between words) is based on how often words co-occur in corresponding regions (e.g., sentences) of an aligned parallel text corpus. The association scores for the different pairs of words are computed and those word pairs are sorted in descending order of their association score. Again, a threshold is chosen and the word pairs whose association score exceeds the threshold become entries in the translation lexicon.

This type of method, however, has disadvantages. One problem is that the association scores are typically computed independently of one another. For example, assume the words in language L1 are represented by the symbol $V_k$, where k is an integer representing different words in L1; and words in language L2 are represented by $W_k$, where k is an integer representing different words in L2. Thus, sequences of the V's and W's represent two aligned text segments. If $W_k$ and $V_k$ occur in similar bilingual contexts (e.g., in the aligned sentences), then any reasonable similarity metric will produce a high association score between them, reflecting the interdependence of their distributions.

However, assume that $V_k$ and $V_{k+1}$ also appear in similar contexts (e.g., in the same sentence). That being the case, there is also a strong interdependence between the distributions of $V_k$ and $V_{k+1}$. Thus, the problem results that if $W_k$ and $V_k$ appear in similar contexts, and $V_k$ and $V_{k+1}$ appear in similar contexts, then $W_k$ and $V_{k+1}$ will also appear in similar contexts. This is known as an indirect association because it arises only by virtue of the associations between $W_k$ and $V_k$ and between $V_{k+1}$ and $V_k$. Prior methods that compute association scores independently of each other cannot distinguish between a direct association (e.g., that between $W_k$ and $V_k$) and an indirect association (e.g., that between $W_k$ and $V_{k+1}$). Not surprisingly, this produces translation lexicons replete with indirect associations, which are likely incorrect as well.

As a concrete example of an indirect association, consider a parallel French-English corpus, consisting primarily of translated computer software manuals. In this corpus, the English terms "file system" and "system files" occur very often. Similarly, the corresponding French terms "système de fichiers", and "fichiers système" also appear together very often. Because these monolingual co-locations are common, the spurious translation pairs fichier/system and système/file also receive rather high association scores. These scores may be higher, in fact, than the scores for many true translation pairs.

This deficiency has been addressed by some prior techniques. For example, Melamed, *Automatic Construction of Clean Broad-Coverage Translation Lexicons*, Second Conference of the Association for Machine Translation in the America's (AMTA 1996), Montreal Canada, is directed to this problem.

Melamed addresses this problem by disregarding highly associated word pairs as translations if they are derived from aligned sentences in which there are even more highly associated pairs involving one or both of the same words. In other words, it is assumed that stronger associations are also more reliable and thus direct associations are stronger than indirect associations. Therefore, if a segment (or sentence) containing V is aligned with a segment (or sentence) containing both W and W' the entries (V,W) and (V,W') should not both appear in the translation lexicon. If they do, then at least one is likely incorrect. Since we assume there is a tendency for direct associations to be stronger than indirect associations, then the entry with the highest association score is the one chosen as the correct association.

In the example discussed above, in parallel English and French sentences containing "fichier" and "systëme" on the French side and "file" and "system" on the English side, the associations of fichier/system and systëme/file will be discounted, because the degree of association for "fichier/file" and "systëme/system" will likely be much higher in the same aligned sentences.

While this approach is reported to extend high accuracy output to much higher coverage levels than previously reported, it does have disadvantages. For example, it is quite complex and cumbersome to implement, and it is believed to be quite time consuming to run.

Another difficulty encountered in learning translation relationships among words involves compounds (or multi-word sequences which are taken together to form compounds). Such compounds may translate to a single word in the other language, or to multiple words in the other language. Prior techniques assumed that lexical translation relationships involved only single words. Of course, as shown from the following list of compounds, this is manifestly untrue:

Base_de_donnees/database

Mot_de_passe/password

Sauvegarder/back_up

Annuler/roll_back

Ouvrir_session/log_on

In the first four pairs listed above, a compound in one language is translated as a single word in another language. However, in the last example, a compound in one language is translated as a compound in the other language, and each of the individual components of the compound cannot be translated in any meaningful way into one of the individual components in the other compound. For example, "ouvrir" which is typically translated as "open", cannot be reasonably translated as either "log" or "on". Similarly, "session" which is typically translated as "session" also cannot be reasonably translated as either "log" or "on".

One prior attempt to address this problem is also discussed by Melamed, *Automatic Discovery of Non-Compositional Compounds in Parallel Data*, Conference on Empirical Methods in Natural Language Processing (EMNLP 97) Providence, R.I. (1997). Melamed induces two translation models, a trial translation model that involves a candidate compound and a base translation model that does not. If the value of Melamed's objective function is higher in the trial model than in the base model, then the compound is deemed valid. Otherwise, the candidate compound is deemed invalid. However, the method Melamed uses to select potential compounds is quite complex and computationally expensive, as is his method of verification by construction of a trial translation model.

Learning translation relationships for larger phrases has received even less attention. Phrase translation has been viewed as either asymmetrical or symmetrical and either directed at fixed phrases or more flexible collocations. A system is asymmetrical if it assumes a set of phrases is given in a source language and the task is to find a translation in a target language, while a symmetrical system views the problem as finding phrases in both languages. Similarly, a system is directed to fixed phrases if it assumes that a translation of a source language phrase is a contiguous sequence of words in the target language.

The only previous work that is both asymmetrical and targeted at fixed phrases is set out in Dagan and Church, *Termight: Coordinating Humans and Machine in Bilingual Terminology Acquisition*, Machine Translation, 12:89-107, (1997). The system is an automated assistant for a lexicographer and proposes technical terms extracted from a corpus using monolingual methods, and for those approved by the user, proposes possible translations from a parallel corpus.

An example of an asymmetrical system directed to flexible collocations is set out in Smadja et al., *Translating Collocations for Bilingual Lexicons: A Statistical Approach*, Computational Linguistics, 22(1):1-38 (1996). Examples of symmetrical systems are set out in: J. Kupiec, *An Algorithm for Finding Noun Phrase Correspondences in Bilingual Corpora*, Proceedings of 31st Annual Meeting of Association for Computational Linguistics, Columbus, Ohio pp. 17-22 (1993); and K. Yamamoto et al., *A Competitive Study on Translational Units for Bilingual Lexicon Extraction*, Proceedings of the Workshop on Data-Driven Machine Translation, 39th Annual Meeting of Association for Computational Linguistics, Toulouse, France pp. 87-94 (2001).

SUMMARY OF THE INVENTION

The present invention learns phrase translation relationships by receiving a parallel aligned corpus with phrases to be learned identified in a source language. Candidate phrases in a target language are generated and an inside score is calculated based on word association scores for words inside the source language phrase and candidate phrase. An outside score is calculated based on word association scores for words outside the source language phrase and candidate phrase. The inside and outside scores are combined to obtain a joint score.

In one embodiment, the combined scores are modified based on how the phrase is being translated across the entire corpus. The inside score is modified and weighted based on the cross-corpus data.

In another embodiment, the modified scores are then converted to a convenient translation confidence metric, such as a log-likelihood-ratio metric.

Another aspect of the present invention includes a phrase translation learning system that includes three models. The first model is an individual word association model that calculates a score for a candidate phrase based on individual word association scores. The second model modifies the scores calculated by the first model based on cross-sentence data indicative of how the source language phrase is being translated across the corpus. The third model is a metric conversion model that converts the phrase translation scores from the second model into a desired confidence metric, accounting for possible changes in the most likely phrase translations based on the conversion.

Another embodiment of the invention also includes a method and system for learning phrase translations that includes looking at translation data across the entire corpus (based on inside and outside scores), modifying and weighting the inside scores and converting the scores to a desired confidence metric.

Another embodiment is a system and method for generating candidate phrases in a phrase translation learning component. Candidate phrases are generated that begin and end with only words that are most strongly associated with a word in the source language phrase, or vice versa. Optionally, candidate phrases can be generated that begin with a capitalized word in the target language sentence.

DETAILED DESCRIPTION OF ILLUSTRATIVE EMBODIMENTS

The discussion of FIG. 1 below is simply to set out but one illustrative environment in which the present invention can be used, although it can be used in other environments as well.

Figure 1:
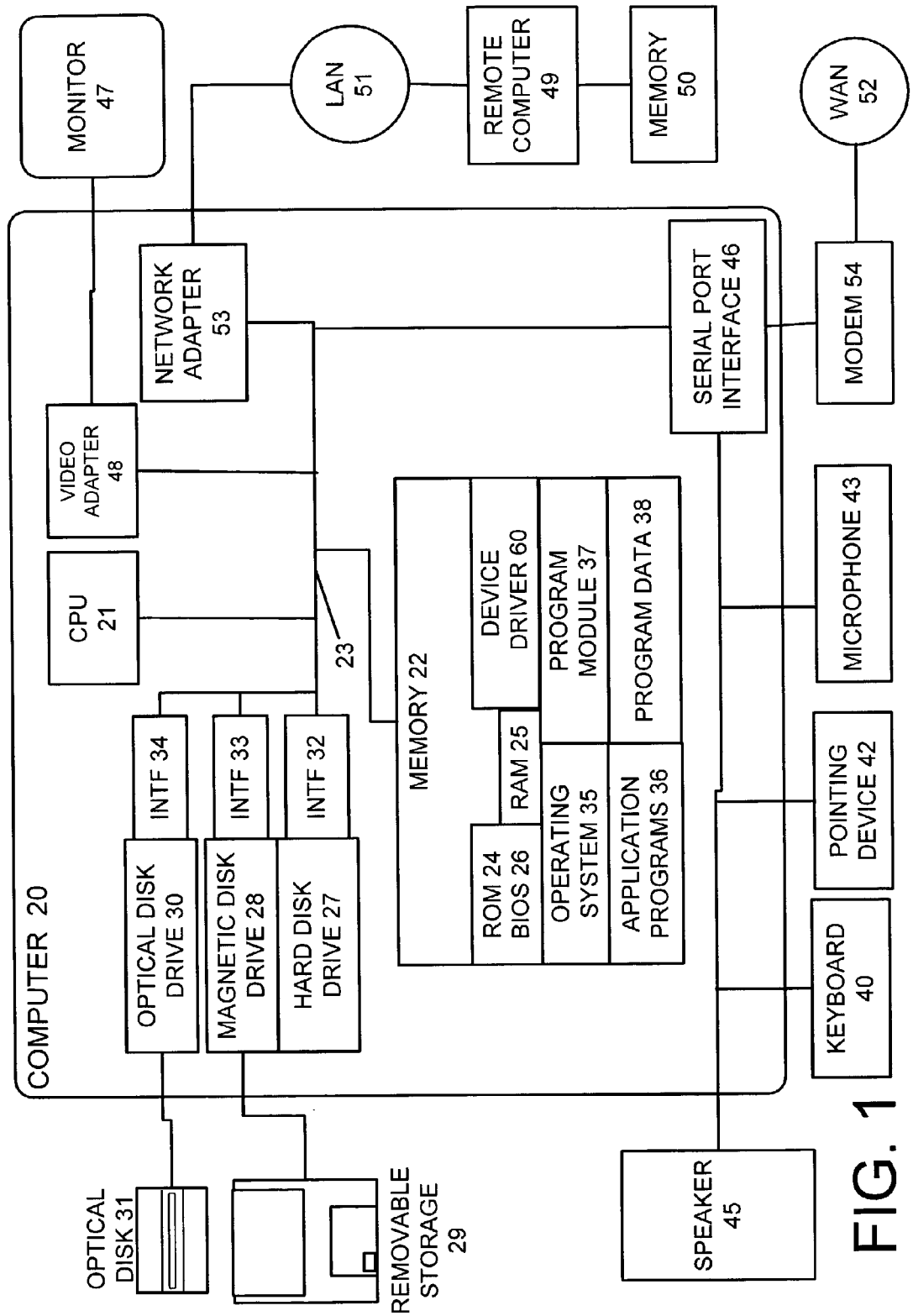
FIG. 1 is a block diagram of a general context in which the present invention can be used.

FIG. 1 is a block diagram of a computer 20 in accordance with one illustrative embodiment of the present invention. FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

The present invention can be utilized to derive translation relationships among phrases in substantially any environment or context. The machine translation architecture about to be described is but one environment or context.

Figure 2A:
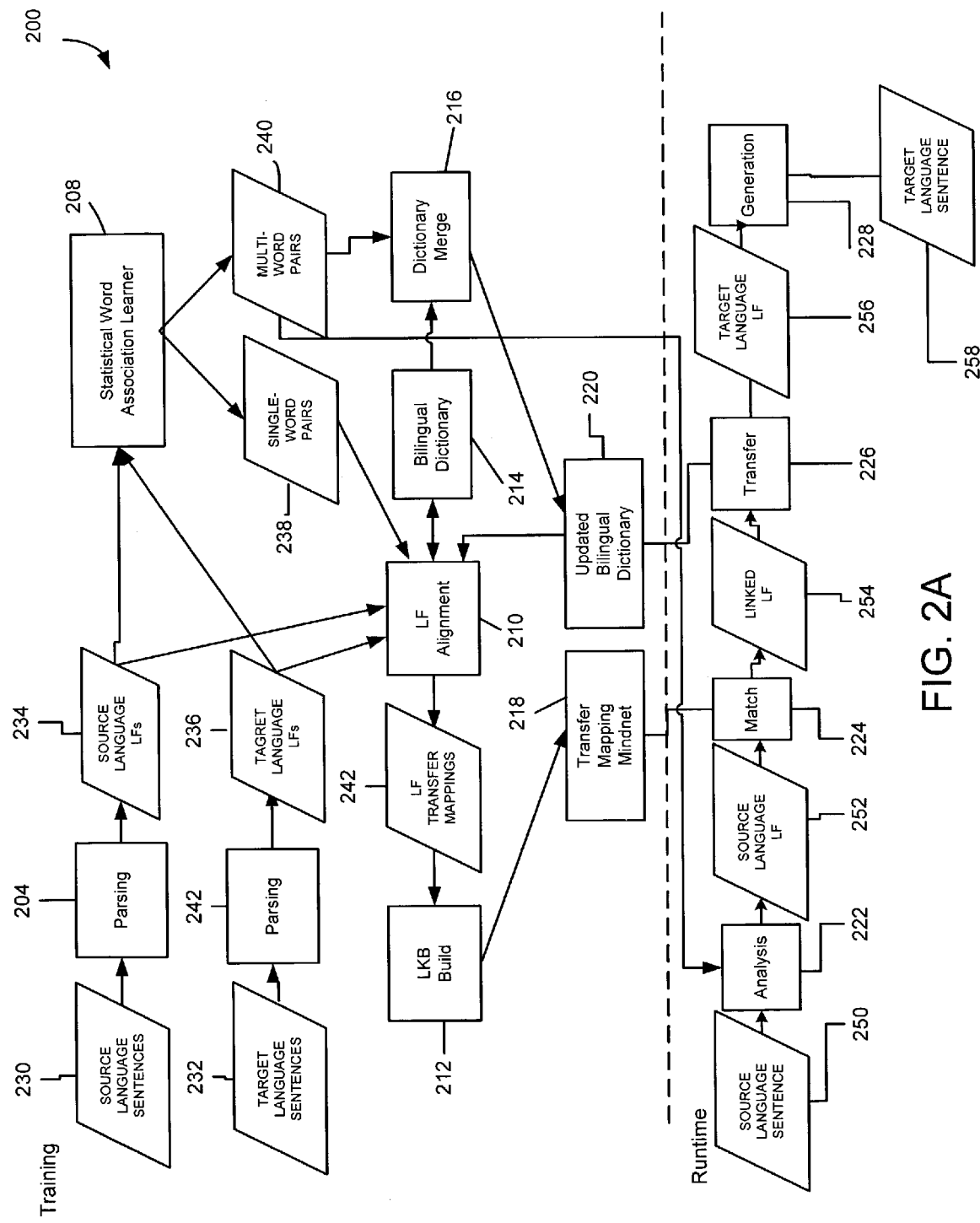
FIG. 2A is a more detailed block diagram of a general machine translation architecture in which the present invention can be used.

While logical forms are not required for the present invention, they are discussed in relation to the machine translation architecture shown in FIG. 2A. Therefore, prior to discussing that architecture in greater detail, a brief discussion of a logical form will be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological analysis on an input text to produce conventional phrase structure analyses augmented with grammatical relations. Syntactic analyses undergo further processing in order to derive logical forms which are graph structures that describe labeled dependencies among content words in the textual input. Logical forms normalize certain syntactical alternations, (e.g., active/passive) and resolve both intrasentential anaphora and long distance dependencies.

Specifically, a logical relation consists of two words joined by a directional relation type (e.g., Part, Time, Hypernym, LogicalSubject, Cause, Domain, Location, Manner, Material, Means, Modifier, Possessor, Purpose, Quasihypernym, Synonym, LogicalObject, and User) A logical form is a graph of connected logical relations representing a single textual input, such as a sentence. It minimally consists of one logical relation. The logical form portrays structural relationships (i.e., syntactic and semantic relationships), particularly argument and/or adjunct relation between important words in an input string.

In one illustrative embodiment of the machine translation architecture, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations.

FIG. 2A is a block diagram of an architecture of a machine translation system 200 which defines one embodiment of an environment for the present invention. System 200 includes parsing components 204 and 206, statistical word association learning component 208, logical form alignment component 210, lexical knowledge base building component 212, bilingual dictionary 214, dictionary merging component 216, transfer mapping database 218 and updated bilingual dictionary 220. During run time, the system utilizes analysis component 222, matching component 224, transfer component 226 and generation component 228.

In one illustrative embodiment, a bilingual corpus is used to train the system. The bilingual corpus includes aligned translated sentences (e.g., sentences in a source or target language, such as English, aligned with their translations in the other of the source or target language, such as Spanish or French, etc.) in which source language phrases for which translation relationships are to be learned are identified or somehow marked. During training, sentences are fed from the aligned bilingual corpus into system 200 as source language sentences 230 (the sentences to be translated), and as target language sentences 232 (the translation of the source language sentences). Parsing components 204 and 206 parse the sentences from the aligned bilingual corpus to produce source logical forms 234 and target logical forms 236. During parsing, the words in the sentences are converted to normalized word forms (lemmas) and are fed into statistical word association learning component 208. Both single word and multi-word associations are iteratively hypothesized and scored by learning component 208 until a reliable set of each is obtained. Statistical word association learning component 208 outputs learned single word translation pairs 238 as well as multi-word pairs 240. The multi-word pairs 240 are provided to a dictionary merge component 216 that is used to add additional entries into bilingual dictionary 214 to form updated bilingual dictionary 220. The new entries are representative of the multi-word pairs 240. The single word pairs 238, along with source logical forms 234 and target logical forms 236 are provided to logical form alignment component 210. Component 210 first establishes tentative lexical correspondences between nodes in the source and target logical forms 230 and 236, respectively. This is done using translation pairs from a bilingual lexicon (or bilingual dictionary) 214 which are augmented with the single word translation pairs 238 from statistical word association learning component 208. Dictionary 214 is also augmented with phrase translation pairs described with respect to FIG. 2B. After establishing possible correspondences, alignment component 210 aligns logical form nodes according to both lexical and structural characteristics and creates logical form transfer mappings 242.

Basically, alignment component 210 draws links between logical forms using the bilingual dictionary information 214, single word pairs 238 and phrase pairs discussed below. The transfer mappings are filtered based on a frequency with which they are found in the source and target logical forms 234 and 236 and are provided to a lexical knowledge base building component 212.

In one example, if the transfer mapping is not seen at least twice in the training data, it is not used to build transfer mapping database 218, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 212 builds transfer mapping database 218 which contains transfer mappings that basically link logical forms, or parts thereof, in one language, to logical forms, or parts thereof, in the second language. With transfer mapping database 218 thus created, system 200 is now configured for runtime translations.

During run time, a source language sentence 250, to be translated, is provided to analysis component 222. Analysis component 222 receives source language sentence 250 and accesses a monolingual dictionary discussed below and parses the source language sentence 250 to create a source logical form 252 based upon the source language sentence input.

The source logical form 252 is provided to matching component 224. Matching component 224 attempts to match the source logical form 252 to logical forms in the transfer mapping database 218 in order to obtain a linked logical form 254. Multiple transfer mappings may match portions of source logical form 252. Matching component 224 searches for the best set of matching transfer mappings in database 218 that have matching lemmas, parts of speech, and other feature information. Larger (more specific) transfer mappings may illustratively be preferred to smaller (more general) transfer mappings. Among mappings of equal size, matching component 224 may illustratively prefer higher frequency mappings. Mappings may also match overlapping portions of the source logical form 252 provided that they do not conflict in any way.

After an optimal set of matching transfer mappings is found, matching component 224 creates links on nodes in the source logical form 252 to copies of the corresponding target logical form segments received by the transfer mappings, to generate linked logical form 254.

Transfer component 226 receives linked logical form 254 from matching component 224 and creates a target logical form 256 that will form the basis of the target translation. This is done by performing a top down traversal of the linked logical form 254 in which the target logical form segments pointed to by links on the source logical form 252 nodes are combined. When combining together logical form segments for possibly complex multi-word mappings, the sublinks set by matching component 224 between individual nodes are used to determine correct attachment points for modifiers, etc. Default attachment points are used if needed.

In cases where no applicable transfer mappings are found, the nodes in source logical form 252 and their relations are simply copied into the target logical form 256. Default single word and phrase translations may still be found in transfer mapping database 218 for these nodes and inserted in target logical form 256. However, if none are found, translations can illustratively be obtained from updated bilingual dictionary 220 which was used during alignment.

Generation component 228 is illustratively a rule-based, application-independent generation component that maps from target logical form 256 to the target string (or output target language sentence) 258. Generation component 228 may illustratively have no information regarding the source language of the input logical forms, and works exclusively with information passed to it by transfer component 226. Generation component 228 also illustratively uses this information in conjunction with a monolingual (e.g., for the target language) dictionary to produce target language sentence 258. One generic generation component 228 is thus sufficient for each language.

Figure 2B:
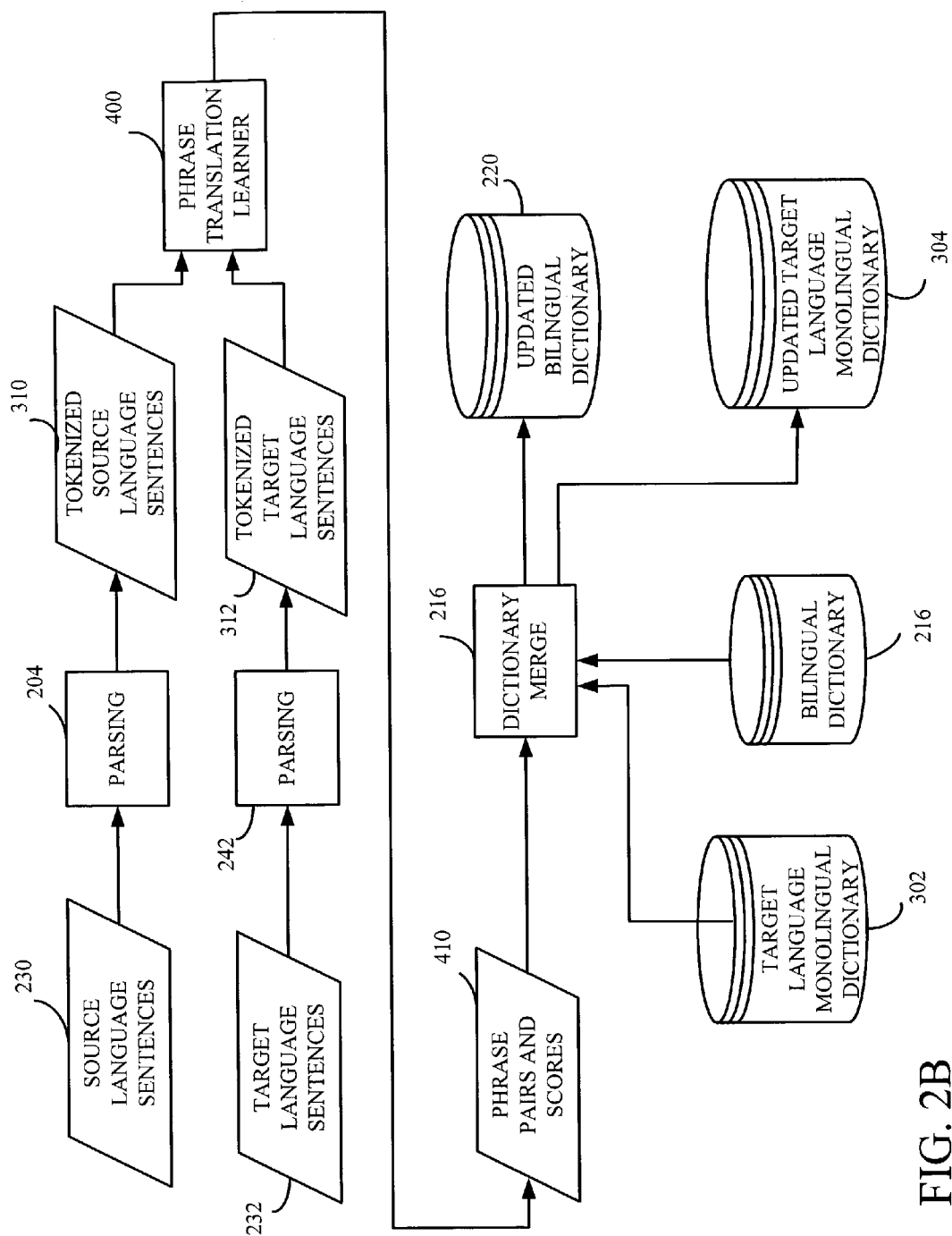
FIG. 2B is a block diagram of a phrase translation learning system that can be used in accordance with one embodiment of the present invention.

FIG. 2B is a more detailed block diagram of a system 300 for learning phrase translations and augmenting the monolingual and bilingual dictionaries used in the system shown in FIG. 2A. System 300 learns phrase translations from an aligned bilingual corpus and is used to augment bilingual dictionary 216 to obtain updated bilingual dictionary 220, and to augment monolingual dictionary 302 to obtain updated monolingual dictionary 304, which is used by parsing component 204 and/or 242 (shown in FIG. 2A) at training time and analysis component 222 (also shown in FIG. 2A) during run time. A number of the items are the same as those described in FIG. 2A and are similarly numbered.

Source language sentences 230 and target language sentences 232 are, as described with respect to FIG. 2A, aligned sentences from an aligned training corpus. Sentences 230 and 232 are provided to parsing components 204 and 242. Parsing components 204 and 242 parse the sentences and tokenize those sentences by marking multiword phrases. The tokenized sentences are indicated by tokenized source language sentences 310 and tokenized target language sentences 312. The parser can mark a variety of multiword phrases.

The tokenized sentences 310 and 312 are input to phrase translation learning component 400. Phrase translation learning component 400 selects phrases of interest from the tokenized source language sentence 310. Phrase translation learning component 400 then learns the associations between the selected marked source language phrases and their translations in the aligned target language sentences, and outputs the translation pairs and their association scores, as indicated by block 410.

The phrase pairs and associated scores 410 are provided to dictionary merge component 216 which merges the phrase pairs and scores into bilingual dictionary 216 to create updated bilingual dictionary 220. Dictionary merge component 216 also augments monolingual target language dictionary 302 with the target language phrases that have been identified as translations of the selected source language phrases, to obtain updated monolingual target language dictionary 304. This updated monolingual dictionary, with the newly learned target language phrases incorporated therein, can thus perform better in parsing the input sentences for logical form alignment as discussed with respect to FIG. 2A. In addition the learned translation relationships in the updated bilingual dictionary improve the performance of alignment itself.

With the above context in mind, the present discussion now proceeds more specifically with respect to learning phrase translations. The present invention can be used to address a problem that arises in parsing raw input text. As discussed in the background section, very little work has been done in translating phrases. This problem is made even more difficult because, in many types of text, particularly certain types of technical texts, phrases are not used in their usual way, but are instead used as the name of something in that particular domain. For example, the sentence "Click to remove the View As Web Page check mark." includes the term "View As Web Page" which has the syntactic form of a nonfinite verb phrase. However, in the sentence, it is used as if it is a proper name. If the parser does not recognize this special use of the phrase, it is virtually impossible to parse the sentence correctly.

In the English language, expressions of this type can be handled in a straight-forward manner, primarily because capitalization conventions in English make these types of phrases easy to recognize. The tokenizer used to tokenize the input text prior to parsing hypothesizes that sequences of capitalized words, such as "View As Web Page" should be treated as lexicalized multi-word expressions. This subclass of multi-words is referred to herein as "captoids".

Identifying translations of these captoids, however, is very difficult. This is primarily because the capitalization conventions in other languages (such as French or Spanish, for example) only capitalize the first word of such an expression. Therefore, while it is relatively straight-forward in the English language to determine where a captoid begins and ends, it is very difficult in other languages.

Figure 3:
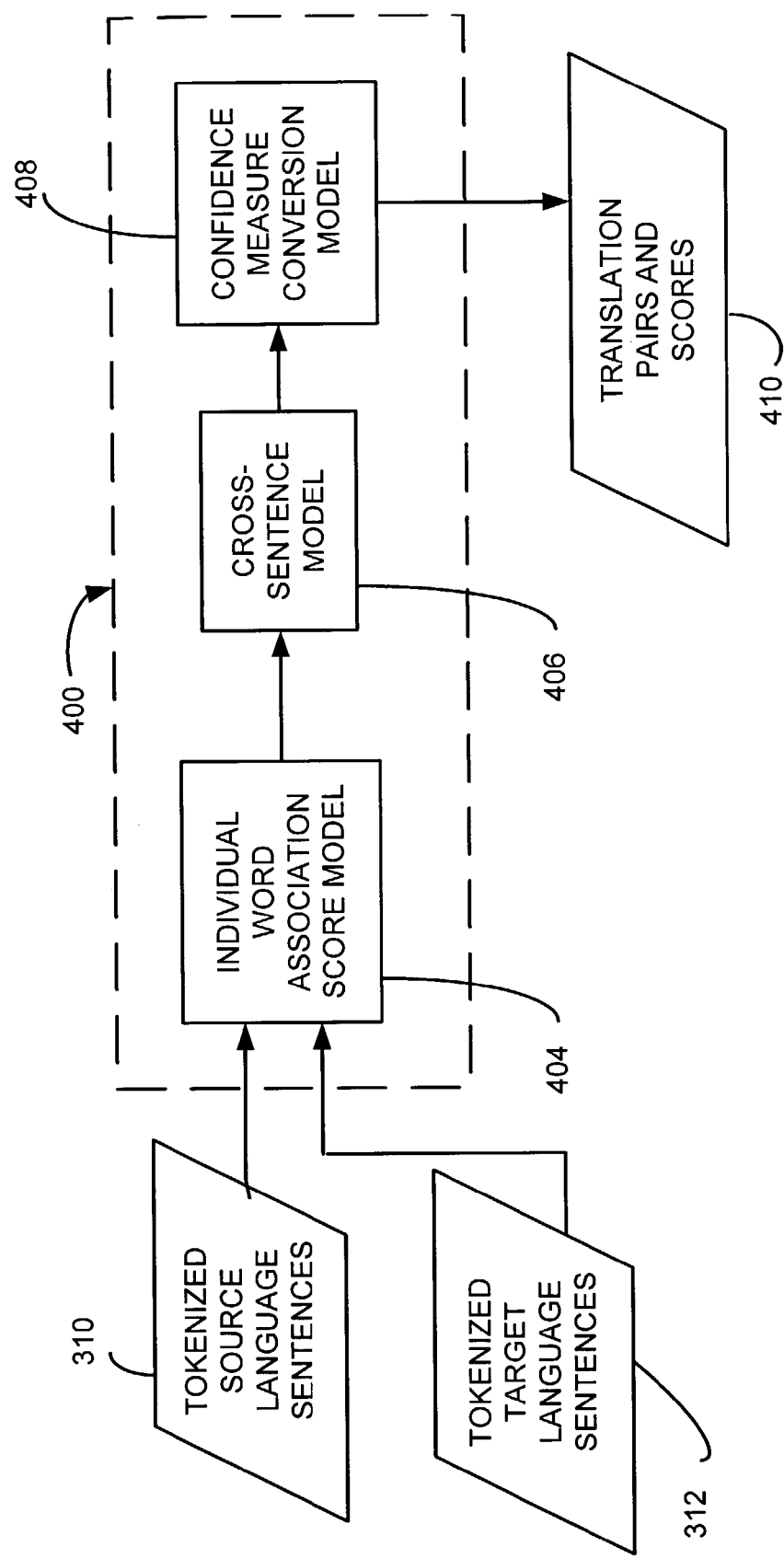
FIG. 3 is a block diagram of a phrase translation learner in accordance with one embodiment of the present invention.

The present invention can be used to identify translations of captoids, and add them to the monolingual lexicon used by the parser and to the bilingual lexicon used at various other places in the machine translation system such that captoids can be accurately parsed and translated. The present invention takes advantage of the fact that, in the English language, such captoids can be identified in a straight-forward manner and also takes advantage of the features of the present invention which can be used to identify compounds. FIG. 3 illustrates phrase translation learning component 400 in greater detail in accordance with one embodiment of the present invention. Phrase translation learning component 400 is suitable for learning associations between phrases which involve captoids, but substantially any other phrases as well.

FIG. 3 illustrates that component 400 receives tokenized sentences 310 and 312 and provides the tokenized aligned sentences to three different models for processing. First, the aligned sentences 310 and 312 are provided to an individual word association score model 404 and then to a cross-sentence model 406 and finally to a confidence measure conversion model 408 which outputs translation pairs and associated scores 410.

Component 400 receives the aligned, tokenized sentences 310 and 312 with phrases identified in the source language sentence and then automatically learns the corresponding phrases in the target language sentence. The target language phrases can be extracted from the translation pairs and associated scores 410 and added to the lexicon used in parsing the target language during training and runtime. In addition, the translation pairs can be added to bi-lingual translation dictionary 214 (also shown in FIGS. 2A and 2B).

Component 400 can also operate on logical forms instead of tokenized sentences. In addition, component 400 can be used outside of a machine translator. For example, component 400 can be used in forming a dictionary or to simply generate phrase translation scores or relationships.

Figure 4:
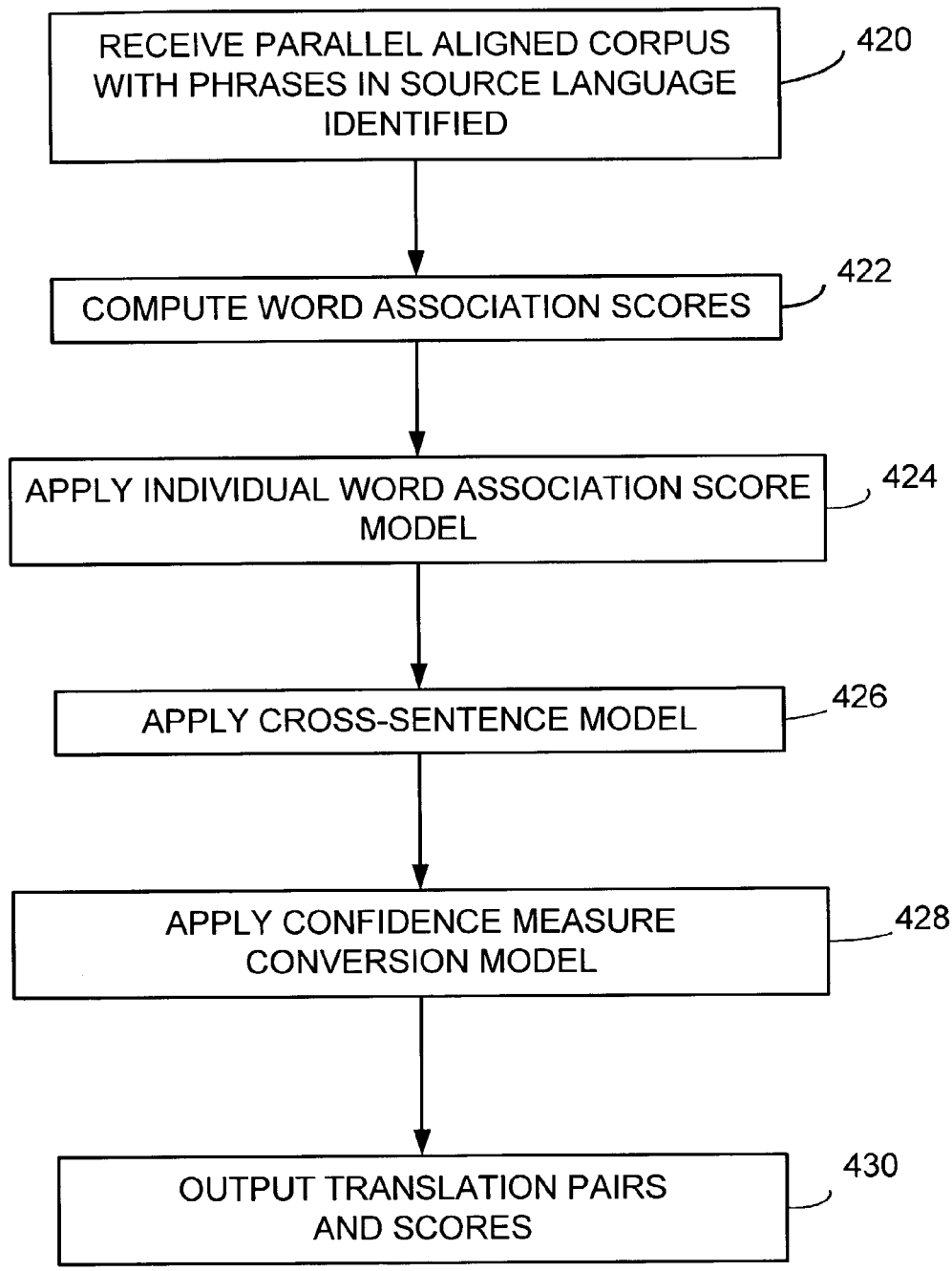
FIG. 4 is a flow diagram illustrating the overall operation of the phrase translation learner shown in FIG. 3.

FIG. 4 is a flow diagram better illustrating the overall operation of component 400 shown in FIG. 3. Component 400 first receives the parallel aligned sentences with phrases to be translated identified in the source language. This is indicated by block 420. It should be noted that the phrases to be translated are assumed to be translated into the target language as a contiguous sequence of words in the target language. In addition, if the phrase to be translated occurs in exactly the same form in the target language sentences as in the source language sentence, it is assumed that the corresponding phrase in that sentence is the desired translation with a probability of 1.0.

In any case, the aligned parsed and tokenized sentences are provided to individual word association score model 404 in system 400. Model 400 can illustratively correspond to the portion of statistical word association learner 208 that computes word association scores for individual word pairs and multi-word pairs previously described, except that multi-words are broken down into their constituent single words before word association scores are computed. In other words, the degree of association between a word ($W_s$) in the source language sentence and a word ($W_t$) in the target language sentence is computed in terms of the frequencies with which $W_s$ occurs in sentences of the source language (S) part of the corpus and $W_t$ occurs in sentences of the target language (T) part of the corpus, compared to the frequency with which $W_s$ and $W_t$ co-occur in aligned sentences of the corpus.

Word association metrics have been used that provide a score indicative of a statistical word association between word pairs in a training corpus. One such metric is the log-likelihood-ratio statistic discussed by Dunning in Dunning, *Accurate Methods for the Statistics of Surprise and Coincidence, Computational Linguistics,* 19(1):61-74 (1993). This statistic is used to compare the overall frequency of a word or lemma in language 1 ($WL_1$) in the training data to the frequency of a word or lemma in language 1 ($WL_1$) given a word or lemma in language 2 ($WL_2$) (i.e., the frequency with which $WL_1$ occurs in sentences of L1 that are aligned with sentences of L2 in which $WL_2$ occurs). Applying the log-likelihood-ratio static therefore provides a measure of the likelihood that an observed positive association between $WL_1$ and $WL_2$ is not accidental.

The list of word pairs for which association scores are computed can also be pruned. In other words, the process of computing the word association scores generates association scores for a large number of word (or lemma) pairs for a large training corpus. Therefore, in one illustrative embodiment, the set of word pairs is pruned to restrict further processing to those pairs having at least some chance of being considered as translation pairs. One illustrative heuristic sets this threshold to be the degree of association of a pair of words or lemmas that have one co-occurrence, plus one other occurrence each.

Model 404 thus computes word association scores for pairs of words in the aligned sentences using the log-likelihood-ratio statistic. This is illustrated by block 422 in FIG. 4.

Based on these scores, individual word association score model 404 hypothesizes a candidate phrase in the target language sentence for each identified phrase in the source language sentence. Model 404 then partitions the sentence pair into the portion of the sentence pair lying within the identified source language phrase and the candidate phrase, and to the portion of the sentences lying outside the identified source language phrase and the candidate phrase.

While the log-likelihood-ratio statistic has proven to be an excellent basis for learning single-word translation relationships (the higher the score, the more likely the association is to be a true translation relation), it is difficult to combine the scores for individual word pairs into a composite score for phrase translation candidates.

Therefore, model 404 generates probabilities (which can be easily combined) from the word association scores for the inside and outside partitions. This is discussed in greater detail with respect to FIGS. 5A and 5B. Briefly, however, model 404 computes a joint probability score for the inside partition of the target language sentence by summing the logarithm of the association probability for the strongest associations that can be found between words in the source language phrase and the candidate phrase translation, and vice versa. This joint probability is referred to as the inside score. The inside score is added to the sum of the logarithms of the association probabilities for the strongest associations that can be found for the source language words not in the identified source language phrase to the target language words not in the candidate phrase translation, and vice versa. This is referred to as the outside score. Thus, if a target language word not in the candidate translation has a high probability of associating with a source language word in the identified source language phrase, that candidate translation is likely to obtain a lower score than another candidate translation that does include the particular target language word.

Model 404 then optionally computes and applies a capitalization probability score which is added to the inside score and is a log probability estimated for several capitalization patterns. This is also discussed below in greater detail with respect to FIGS. 5A and 5B. Application of model 404 is illustrated by block 424 in FIG. 4.

The partition scores are then provided to cross-sentence model 406. Model 406 has the effect of considering tendencies in the translation of particular phrases across all sentences in the aligned corpus. If a given phrase has a clearly preferred translation in several sentences, that can be taken into account in choosing a translation for the phrase in a sentence where the individual word association probabilities leave the translation of the phrase unclear.

Figure 10:
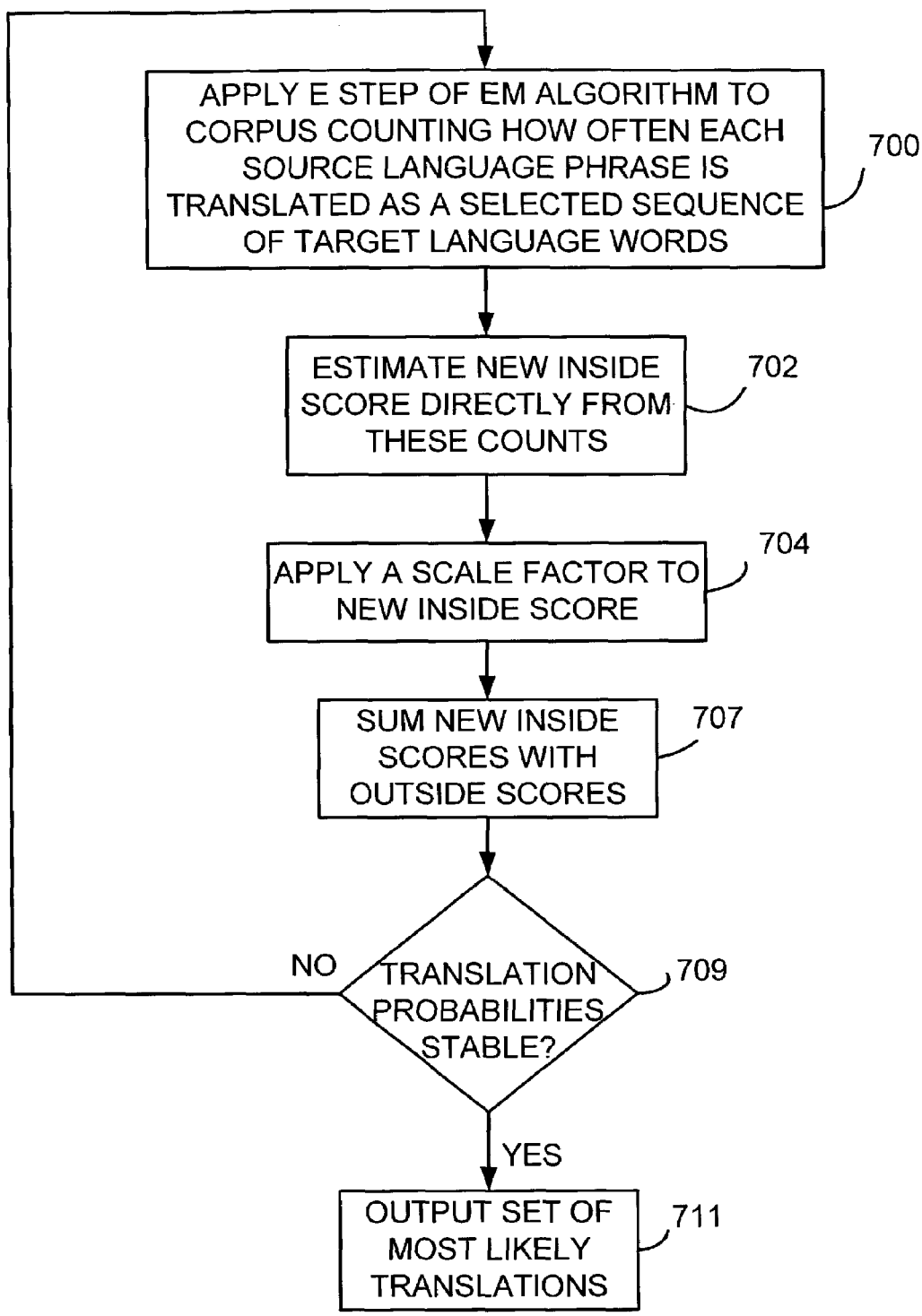
FIG. 10 is a flow diagram illustrating the operation of a cross-sentence model in accordance with one embodiment of the present invention.

While application of model 406 is described in greater detail with respect to FIG. 10, it is briefly described here for the sake of clarity. Model 406 replaces the inside score generated in model 404 by the logarithm of the product of a direct estimate of the conditional probability of the candidate phrase occurring given the source language phrase and a direct estimate of the conditional probability of the source language phrase occurring given the candidate phrase. The revised inside score is then scaled and combined with the original word-association-based outside score. The initial values for the revised inside scores are estimated using model 404 and are iteratively re-estimated using the EM algorithm. This is done illustratively by treating the composite scores as if they were log probabilities, and normalizing them across a set of candidate translations for each source language phrase carried forward from estimating model 404. Applying cross-sentence model 406 is illustrated by block 426 in FIG. 4.

The revised scores are then provided to confidence measure conversion model 408, which is applied to those scores. This is described in greater detail with respect to FIG. 11. Briefly, model 408 replaces the combination of conditional probabilities for the identified phrase in the source language, and its candidate translation in the target language, with the log-likelihood-ratio metric based on the entire phrase, and the context outside of the phrase and the candidate translation is eliminated. The model parameters are iteratively recomputed using the Viterbi re-estimation. When the re-estimation converges, the final set of phrase translation scores is obtained in terms of the log-likelihood-ratio metric for the entire phrases. This generates a consistent set of log-likelihood-ratio scores to use as a confidence measure for the phrase translation pairs 410. Application of model 408 is illustrated by block 428 in FIG. 4. The final phrase translation pairs and related scores are output as illustrated by block 430 in FIG. 4.

Figure 5A:
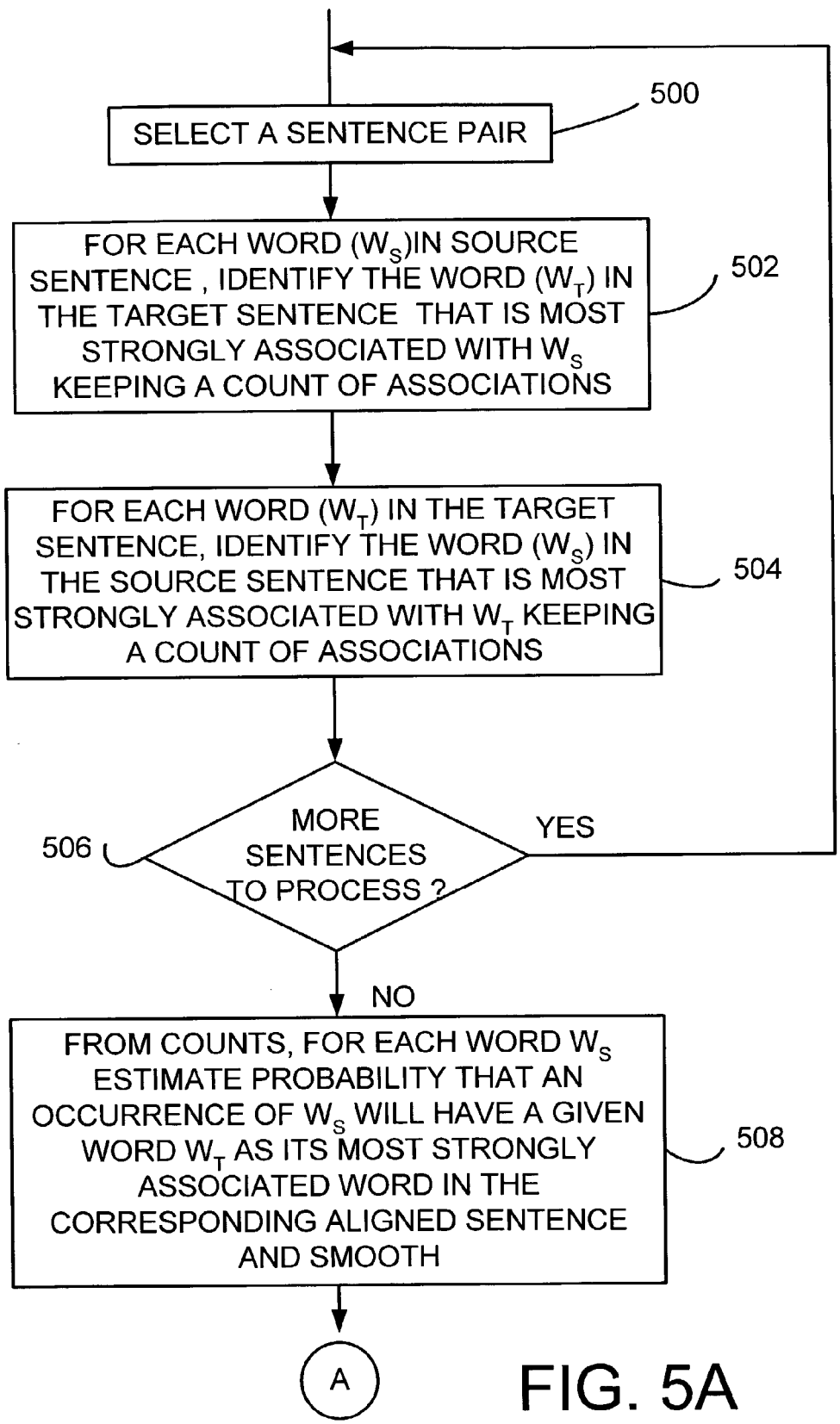
FIGS. 5A and 5B show a flow diagram illustrating the operation of an individual word association score model in accordance with one embodiment of the present invention.
Figure 5B:
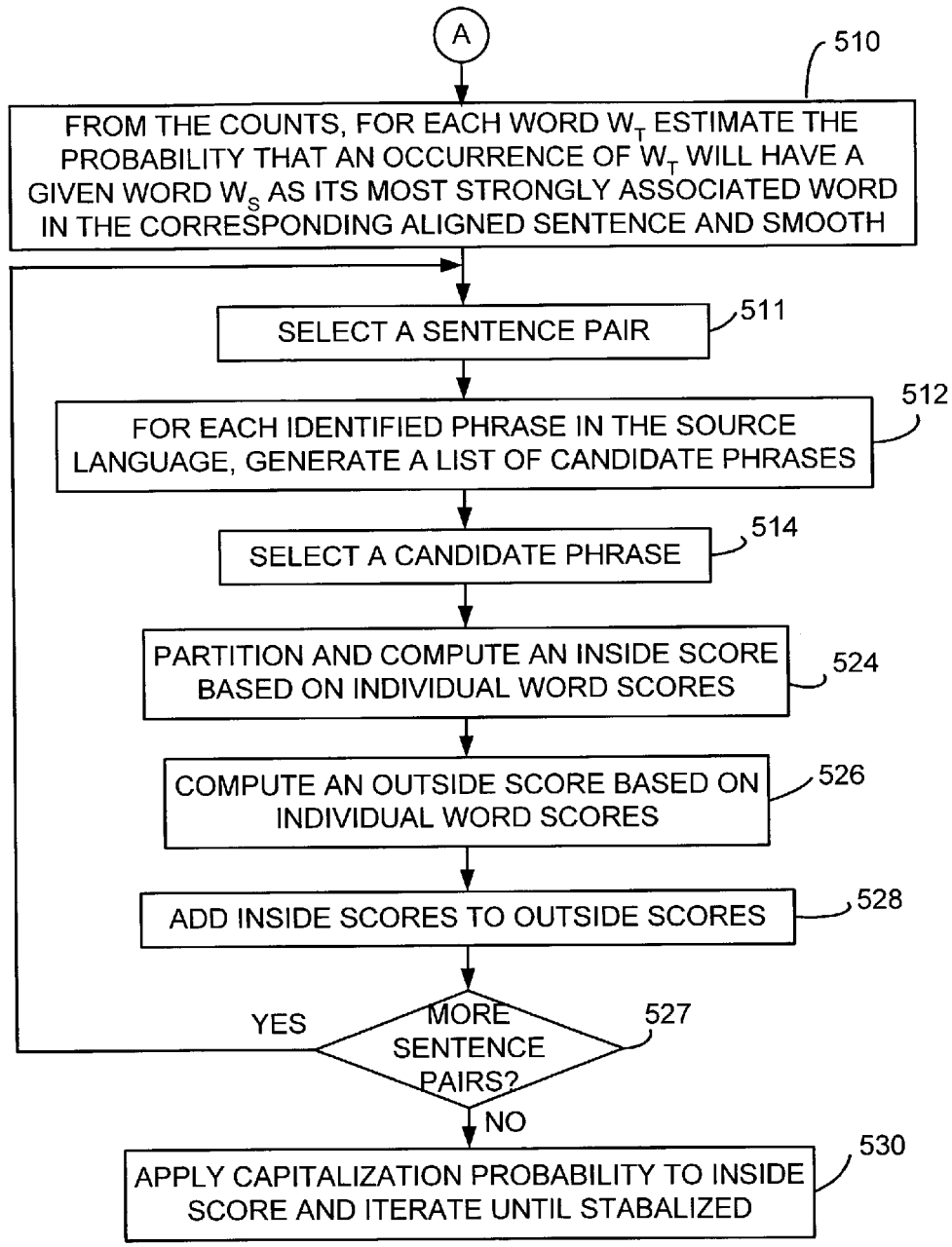

The phrase translation aspect of the present invention will now be described in greater detail. FIGS. 5A and 5B are flow diagrams better illustrating the operation of model 404 in accordance with one embodiment of the present invention. Recall that prior to applying model 404, all of the single word associations have been computed as discussed above. In addition, all phrases in the source language sentences for which translations are to be obtained have been identified.

To derive combinable probabilities from word association scores, model 404 first selects a pair of sentences (i.e., one sentence in the source language and its aligned sentence in the target language). This is indicated by block 500 in FIG. 5A. Then, for each word ($W_s$) in the source language sentence, model 404 identifies the word ($W_t$) in the target language sentence that is most strongly associated with $W_s$, keeping a count of those most strong associations. This is indicated by block 502 in FIG. 5A.

Then, for each word ($W_t$) in the target language sentence, model 404 identifies the word ($W_s$) in the source language sentence that is most strongly associated with $W_t$, again keeping a count of the most strong associations. This is indicated by block 504. This is done for each aligned sentence pair as indicated by block 506.

Since the word association scores are in terms of log-likelihood-ratio, they are difficult to combine with one another to obtain phrase translations. Therefore, model 404 then estimates probabilities from the counts since probabilities can be easily combined. Specifically, from the counts generated, and for each word $W_s$, model 404 estimates a probability that an occurrence of $W_s$ will have a given word $W_t$ as its most strongly associated word in the corresponding aligned sentence. This is indicated by block 508.

Similarly, from the counts, for each word $W_t$, model 404 estimates the probability that an occurrence of $W_t$ will have a given word $W_s$ as its most strongly associated word in the corresponding aligned sentence. This is indicated by block 510.

The probabilities estimated are then smoothed using a known smoothing technique such as the well known Good-Turing smoothing method. The purpose of smoothing an empirically estimated probability distribution is usually to assign some small probability to events that have never been observed in the training data. That is, the empirically observed probability of some or all observed events is reduced by some amount, and distributed over the set of possible, but unobserved, events. If this type of smoothing is not performed, all events not observed in the training data will be assigned a probability of 0.

The type of event that we are most concerned about avoiding the assignment of a probability of 0 to are events in which a word in the source language sentence or target language sentence has no known association with any word in the other sentence. This can happen due to a free translation, so that a particular word in either the source or target language sentence has no literal translation, or due to function words in one language that have no corresponding word in the other language. For example, a relation expressed by a preposition in one language might be indicated purely by word order in another language, with no specific word expressing the relation.

To model the situation in which a word in one language is associated with no corresponding word in the other language, we make use of the notion of a "null" word, which we treat as occurring in every sentence (or part of a sentence). When we find that a given word has no known association with any word in the other language, in the sentence pair in question, we classify that as a case where the most highly associated word is the "null" word. In our application of smoothing to the probabilities currently under discussion, all of the probability taken away from the observed events is assigned to the events associating source and target language words to the "null" word. The amount of probability to be subtracted from the observed events can be illustratively computed using the well-known Good-Turing method, applied to the observed events occurring less than a certain small number of times (illustratively 10) in the training data.

After computing these smoothed probabilities, model 404 then goes through all the sentence pairs again, selecting a sentence pair and generating a list of candidate phrases in each target language sentence for each identified phrase in the corresponding source language sentence. This is illustrated by blocks 511 and 512 and is discussed in greater detail later in the application with respect to FIG. 8. Suffice it to say that, in each aligned sentence pair, for an identified phrase in the source language sentence, one or more candidate phrases are hypothesized in the target language sentence (including possibly the empty phrase). Model 404 then goes on to calculate a score associated with each candidate phrase.

For each sentence pair and each identified phrase in the source language sentence of the pair, Model 404 thus first selects a candidate target language phrase as indicated by block 514. Model 404 then partitions the source and target language sentences based on the identified phrase in the source language sentence and the candidate phrase in the target language sentence. This is better illustrated with respect to FIG. 6.

Figure 6:
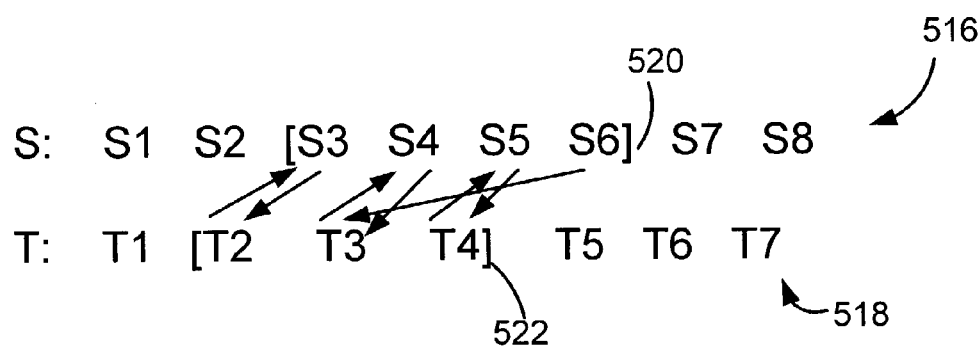
FIG. 6 illustrates the calculation of an inside score in accordance with one embodiment of the present invention.

For example, assume that the source language sentence 516 has words S1-S8 as shown. Assume that the aligned target language sentence 518 has words T1-T7 as shown. FIG. 6 further shows that the phrase to be translated from the source language sentence 516 is identified by the brackets around terms S3-S6 and is identified by numeral 520. The candidate phrase for which a score is currently being computed is identified by the brackets at numeral 522. Thus, both the source language sentence 516 and the target language sentence 518 are partitioned into portions within phrases 520 and 522 and portions of the sentences outside of the phrases 520 and 522.

Model 404 then computes an inside score based on the smoothed association probabilities discussed above. This is indicated by block 524 in FIG. 5B. In computing the inside score, model 404 first determines for each word in source language sentence 516 within phrase 520, what word in target language sentence 518, also within candidate phrase 522, is most likely to be most strongly associated with the word in the source language sentence according to the smoothed association probabilities. The "null" word is treated as part of the candidate phrase 522, and may be the word most likely to be most strongly associated with the word in the source language sentence.

Thus, model 404 first determines which word in phrase 522 is likely to be strongly associated with word $S_3$ in phrase 520. It can be seen that the corresponding most strongly associated word is $T_2$. This is then done for each of the remaining words in phrase 520 and it can be seen that source language word $S_4$ is most strongly associated with target $T_3$, as is source language word $S_6$. Also, source language word $S_5$ is most strongly associated with target language word $T_4$.

This operation is performed in both directions so that, for each target language word in candidate phrase 522, model 404 determines which word in source language phrase 520 is likely to be most strongly associated with it. For this purpose, the "null" word is also treated as part of the source language phrase. It can be seen that target language word $T_2$ is likely to be most strongly associated with source language word $S_3$, target language word $T_3$ is likely to be most strongly associated with source language word $S_4$ and target language word $T_4$ is likely to be most strongly associated with source language word $S_5$.

Having identified the best word pairs inside source language phrase 520 and candidate phrase 522, the probability of those word pairs are combined by taking the logarithm of their product. This is illustrated, for example, by Equation 1 in which the probabilities of each source language word being most strongly associated with the identified target language words and each target language word being most strongly associated with the identified source language words are combined with one another.

$$log(P(s_3 \rightarrow t_2) \cdot P(t_2 \rightarrow s_3) \cdot P(s_4 \rightarrow t_3) \cdot P(t_3 \rightarrow s_4) \cdot P(s_5 \rightarrow t_4) \cdot P(t_4 \rightarrow s_5) \cdot P(s_6 \rightarrow t_3))) \quad \text{Eq. 1}$$

This is the inside score computed as illustrated by block 524 in FIG. 5B.

Figure 7:
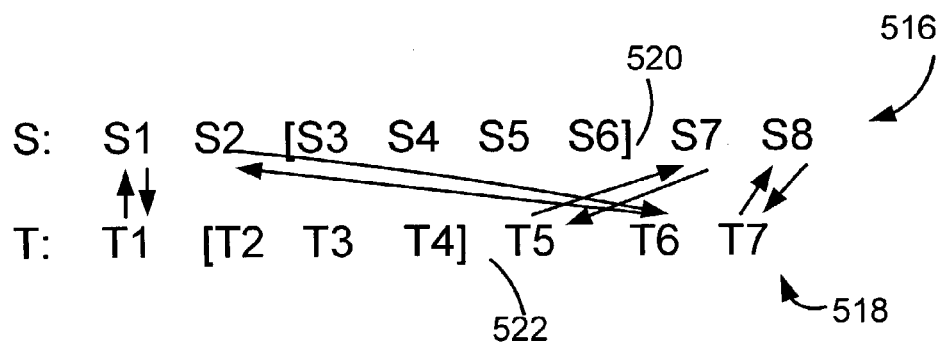
FIG. 7 illustrates calculation of an outside score in accordance with one embodiment of the present invention.

Next, model 404 computes an outside score for sentences 516 and 518 in the same way. This is indicated by block 526. In other words, as shown in FIG. 7, model 404 determines, for each source language word outside of phrase 520, which target language word outside of candidate phrase 522 is likely to be most strongly associated with it. Similarly, for each target language word outside of candidate phrase 522, which source language word outside of identified phrase 520 is likely to be most strongly associated with it. One illustrative determination of these likelihoods is illustrated by the arrows shown in FIG. 7. The probabilities are then combined as shown in Equation 2.

$$log(P(s_1 \rightarrow t_1) \cdot P(t_1 \rightarrow s_1) \cdot P(s_2 \rightarrow t_6) \cdot P(t_6 \rightarrow s_2) \cdot P(s_7 \rightarrow t_5) \cdot P(t_5 \rightarrow s_7) \cdot P(s_8 \rightarrow t_7) \cdot P(t_7 \rightarrow s_8))) \quad \text{Eq. 2}$$

The inside and outside scores are then added together as illustrated by block 528 in FIG. 5B. This can be viewed as the basic score computed by model 404 in analyzing the translation relationship between phrases 520 and 522 and it is repeated for each sentence pair as indicated by block 527. By assigning scores to both partitions (inside and outside the phrases), the present invention does a much better job of identifying words which correctly belong in a translation of an identified phrase in the source language sentence than have prior techniques.

For each sentence pair and each identified source language phrase, the candidate target language translations are stored along with their inside and outside scores, so that these do not have to be recomputed in further stages of processing. For the sake of minimizing the storage required, as well as minimizing the amount of subsequent processing, the number of candidate phrases stored for each sentence pair and each identified source language phrase can optionally be pruned to some number (illustratively, 15) of highest scoring candidate phrases.

After processing the entire corpus—to further reduce the amount of subsequent processing required—the total number of candidate target language translations for each identified source language phrase can optionally be further pruned to some number (illustratively, 15) of the most likely candidate translations across the entire corpus. The most likely candidate translations for each identified source language phrase across the entire corpus can be identified by obtaining weighted counts for each candidate using the E step of the EM algorithm as described below with reference to model 406. The higher the weighted count, the more likely the candidate translation.

Model 404 can also apply an additional probability reflecting the likelihood of the capitalization pattern of the candidate phrase, if the phrase to be translated from the source language sentence is a captoid. This is, of course, optional, and can be eliminated where it is not desired. In any case, a number of different capitalization patterns are illustratively considered in this portion of model 404. For example, where the identified phrase is a captoid, and the candidate phrase has its first word capitalized, this is illustratively associated with a first, relatively high probability. Where none of the words in the candidate phrase are capitalized, this is illustratively associated with a second, lower probability. Finally, where the candidate phrase does not have its first word capitalized, but other words in the candidate phrase are capitalized, this is illustratively associated with a third, even lower probability. The capitalization probabilities are initially estimated from the candidate phrases that have the highest translation probability (highest inside score plus outside score) for each sentence pair and each identified source language phrase.

The logarithm of the capitalization probability is illustratively added to the inside score previously computed for the phrase translation. This may, of course, change which candidate phrases have the highest translation probabilities for the identified source language phrases. Thus, applying the capitalization probabilities and recomputing the translation scores and capitalization probabilities is iteratively performed until the candidate phrases that have the highest translation scores stabilizes. Application of the capitalization probability is illustrated by block 530 in FIG. 5B.

Figure 8:
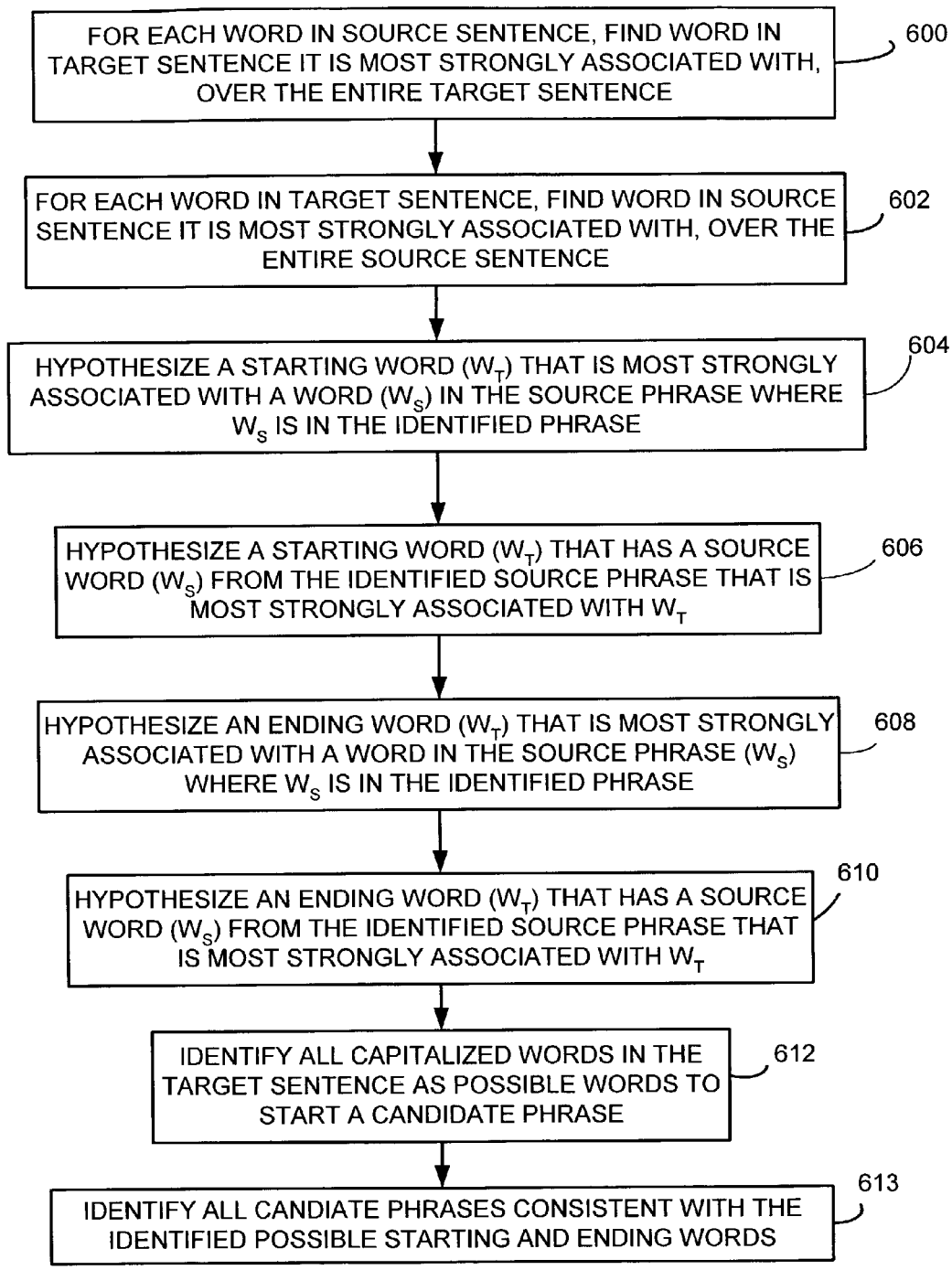
FIG. 8 is a flow diagram illustrating the generation of candidate phrases in accordance with one embodiment of the present invention.

Prior to discussing model 406 in greater detail, the present discussion proceeds with reference to FIG. 8 which is a flow diagram illustrating how candidate phrases are hypothesized or generated in the target language sentence. A wide variety of different techniques can be used to generate candidate phrases. For example, all possible sub-sequences of each target language sentence can be hypothesized as a candidate phrase. However, this may take an undesirable amount of time and computational resources. Therefore, in accordance with one illustrative embodiment of the present invention, candidate phrases are heuristically hypothesized.

In accordance with one embodiment of the invention, in order to generate a candidate phrase in the target language sentence, model 404 selects each word in the source language sentence. For each word in the source language sentence, it finds the word in the target language sentence that the word in the source language sentence is most strongly associated with over the entire target language sentence. This is indicated by block 600 in FIG. 8. Then, for each word in the target language sentence, model 404 finds the word in the source language sentence that the word in the target language sentence is most strongly associated with, over the entire source language sentence. This is indicated by block 602. For the purposes of identifying these most strongly associated words, "null" words are not considered.

Figure 9A:
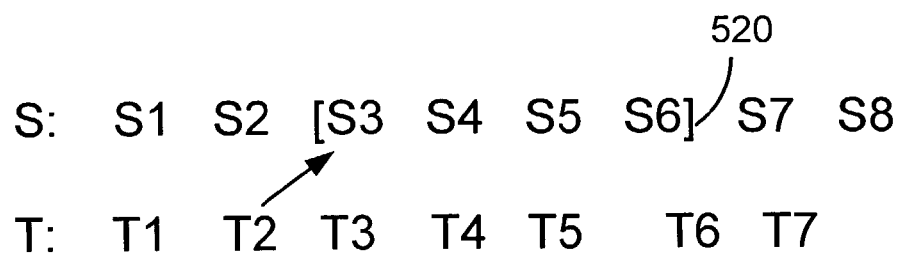
FIGS. 9A and 9B illustrate aligned sentences processed to generate candidate phrases.

Model 404 then hypothesizes that each word ($W_t$) that is most strongly associated with a word ($W_s$) in the source language phrase 520 can begin a candidate phrase. This is better illustrated with respect to FIG. 9A and is also illustrated by block 604 in FIG. 8. FIG. 9A shows that word $T_2$ in the target language sentence is most strongly associated with word $S_3$ in the identified source language phrase 520 in the source language sentence. Thus, model 404 hypothesizes that a candidate phrase begins with word $T_2$.

Figure 9B:
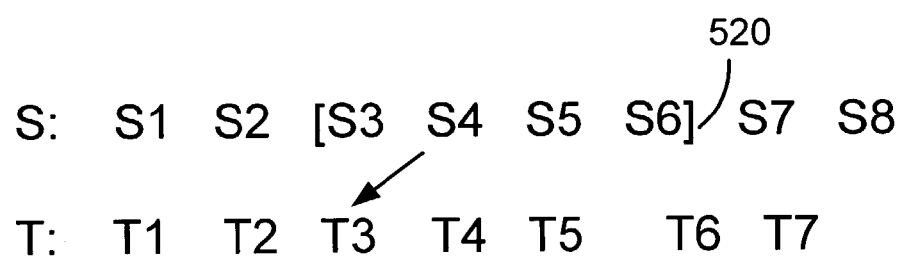

Model 404 also hypothesizes that each word $W_t$ that has a word $W_s$ from the identified source phase 520 that is most strongly associated with it can begin a candidate phrase. This is indicated by block 606 and is better illustrated by FIG. 9B. FIG. 9B shows that source language word $S_4$, which is within phrase 520, is most strongly associated with target language word $T_3$. Thus, model 404 hypothesizes a candidate phrase beginning with word $T_3$.

Model 404 also hypothesizes that candidate phrases end with strongly associated words as well. Thus, it hypothesizes that each word ($W_t$) that is most strongly associated with a word ($W_s$) in the source language phrase 520 can end a candidate phrase. This is indicated by block 608. Similarly, the model hypothesizes that each word ($W_t$) that has a word ($W_s$) from the identified source language phrase 520 that is most strongly associated with $W_t$ can end a candidate phrase. This is indicated by block 610.

As an additional, optional step, model 404 can identify all capitalized words in the target language sentence as possible starting words in candidate phrases. This is indicated by block 612 in FIG. 8.

Finally, all possible candidate phrases are generated that begin with one of the identified possible starting words and end with one of the identified possible ending words that follows the selected starting word. This is indicated by block 613.

It has been found that by only allowing candidate phrases to begin or end with words that are strongly associated with words in the identified sources phrase, we reduce the likelihood of including function words where those words are not wanted in the translation. Function words can be problematic, because they often are not strongly associated with anything and thus the probabilities will not punish the model for including the word where it should not be included. Thus, the present technique addresses that problem.

While model 404 considers information both inside and outside the phrase partitions in aligned sentences, it does not consider how the identified phrases are being identified across other sentence pairs in the corpus. Thus, model 406 considers this information. In model 406, the E step of the EM algorithm is applied to the corpus and the scores for translation pairs computed in model 404. Model 406 thus counts how often each source language phrase is translated as a selected sequence of target language words, weighted by the normalized probability that model 404 assigns to each possible translation (after optional pruning as discussed above), treating the model 404 scores as log probabilities.

For example, suppose in a particular sentence pair, we identify exactly two target language sequences as candidate translations for a particular source language phrase. Suppose the model 404 score of the first candidate is equal to the logarithm of 0.0001, and the model 404 score of the second candidate is equal to the logarithm of 0.0009. According to the E step of the EM algorithm, we normalize these probabilities by multiplying them by a common factor selected to make the results sum to 1, which would give us 0.1 and 0.9, respectively, as the normalized probabilities of the two candidates. We would then add 0.1 to the weighted count of the number of times the first candidate occurs as the translation of the source language phrase, and we would add 0.9 to the weighted count of the number of times the second candidate occurs as the translation of the source language phrase. Applying the E step of the EM algorithm across the aligned corpus is illustrated by block 700 in FIG. 10.

Model 406 then estimates a new inside score directly from the weighted counts. This is indicated by block 702. For example, if there are 10 occurrences of a particular source language phrase in the corpus and the weighted counts computed by the E step of the EM algorithm for a particular candidate target language phrase being its translation add up to 7, model 406 assigns a 0.7 probability ($7/10$) of the source language phrase being translated as the sequence of target language words in that candidate phrase. We similarly compute the probability of an occurrence of the candidate phrase being a translation of the source language phrase. Thus if there are a total of 20 occurrences of the candidate phrase, then model 406 assigns a 0.35 probability ($7/20$) of the candidate phrase being the translation of the source language phrase. The logarithm of the product of these two probabilities forms the base of the new inside score. Thus, model 406 makes use of information as to how the identified phrase in the source language is being translated across the entire corpus.

However, this technique creates a scaling problem. Because the inside and outside scores are to be combined, combining only two probabilities in the new inside score with the many probabilities composing the outside score would result in too much weight being placed outside of the phrases and not enough weight on the inside score. To prevent this from happening, we need to scale the new inside score so that it exhibits as much variation as the old inside score. We compute an appropriate scale factor by computing the standard deviation of the old inside scores (not incorporating the capitalization probability) and the standard deviation of the new inside score base for the most likely translations of all the occurrences of identified source language phrases in the corpus. These standard deviations are measures of the degree of variation in the old inside score and the new inside score base, so we scale the new inside score by multiplying the new inside score base by a scale factor consisting of the ratio of these two standard deviations, which results in a new scaled inside score that has the same standard deviation as the old inside score. Applying this scale factor to the new inside score base is indicated by block 704 in FIG. 10.

The initial estimate of the model 406 scores are then the sums of the new scaled inside scores and the old outside scores. Summing these scores is indicated by block 707. As with the introduction of capitalization probabilities, however, this changes relative probabilities of competing translation candidates in each sentence pair. Thus we iteratively re-estimate the translation probabilities for each sentence pair, the weighted counts, and the resulting phrase translation probabilities, until the most likely translation for each identified source language phrase in each sentence pair no longer changes. This is indicated by block 709. Model 406 thus produces a new set of most likely translations which take into account the effect of translations across the entire corpus. This is indicated by block 711. This set of most likely translations is provided to model 408.

Figure 11:
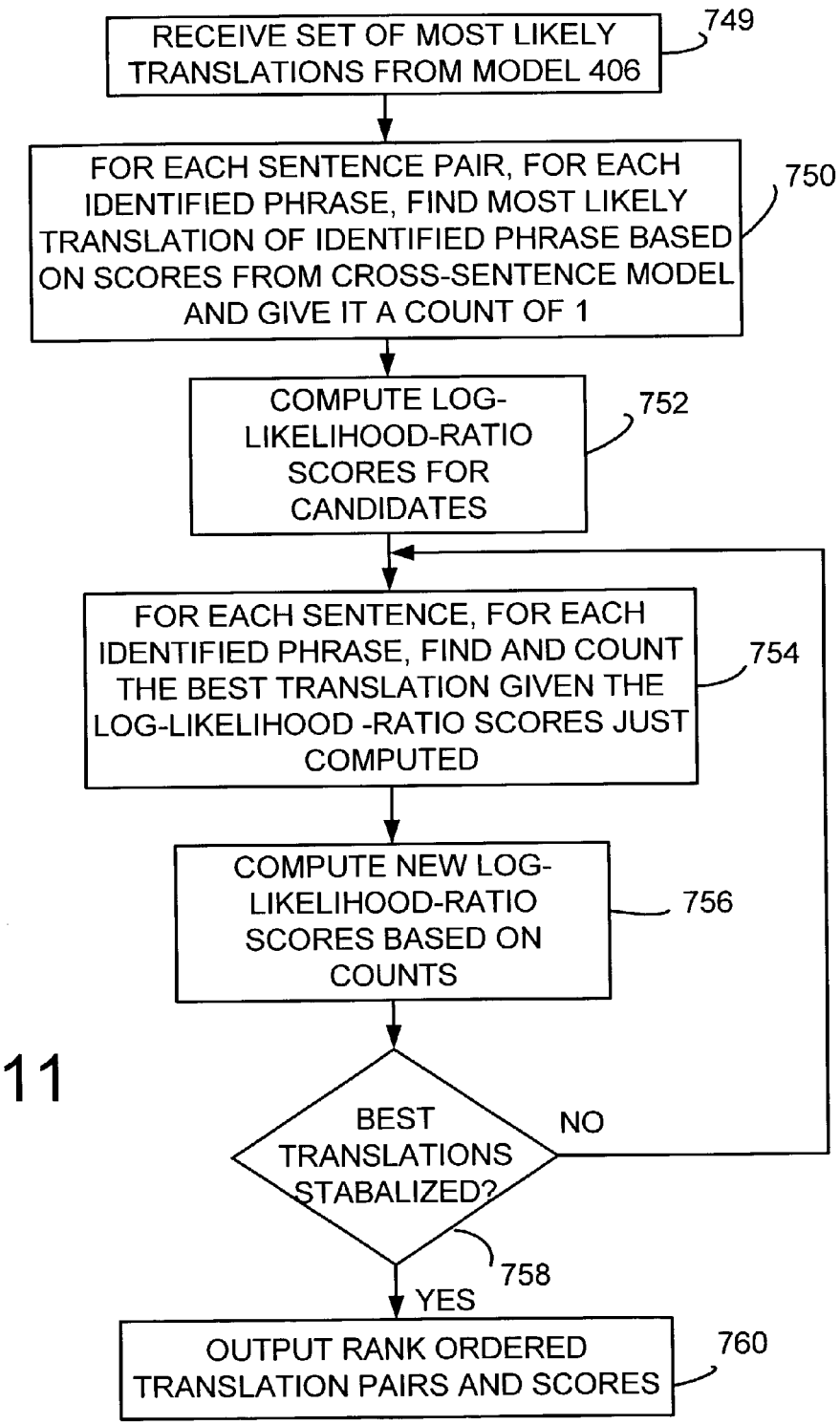
FIG. 11 is a flow diagram illustrating operation of a confidence measure conversion model in accordance with one embodiment of the present invention.

FIG. 11 is a flow diagram illustrating the operation of model 408 in greater detail. Model 408 receives the most likely translations from model 406, as indicated by block 749. As previously discussed, the log-likelihood-ratio scores are a very good indicator of how much confidence to place on a hypothesized translation relation. Thus, converting back to the log-likelihood-ratio scores can be desirable.

For each sentence pair, and for each identified phrase, model 408 receives the most likely translation of the identified phrase from the computation of model 406 and gives this most likely translation a count of 1. This is indicated by block 750 in FIG. 11. Model 408 then goes back through the corpus and recomputes the log-likelihood-ratio scores for all of the candidate phrases based on the counts. This is indicated by block 752.

For each sentence and for each identified phrase, model 408 finds and counts the best translation given the log-likelihood-ratio scores just computed. This is indicated by block 754. Model 408 then computes new log-likelihood-ratio scores based on the new counts. This is indicated by block 756. The new log-likelihood-ratio scores may identify different phrase translations. Therefore, model 408 iterates on steps 754 and 756 until the best phrase translations remain the same, or stabilize. This is indicated by block 758.

Once the best translations have stabilized, model 408 outputs rank ordered translation pairs and scores, as indicated by block 760.

It can thus be seen that the present invention enhances the derivation of translation relationships for captoids and other types of phrases.

Although the present invention has been described with reference to particular embodiments, workers skilled in the art will recognize that changes may be made in form and detail without departing from the spirit and scope of the invention.

What is claimed is:

1. A method of identifying a translation relationship between a phrase in a source language and a phrase in a target language, comprising:
    receiving access to an aligned pair of multiple word units, one being a source unit in the source language and another being a target unit in the target language, the source language phrase being identified in the source unit;
    generating at least one candidate phrase in the target unit, the candidate phrase being a hypothesized translation of the source language phrase;
    calculating a score for each candidate phrase including an inside component based on associations between words inside the source language phrase and candidate phrase and an outside component based on associations between words in the source unit but outside the source language phrase and words in the target unit but outside the candidate phrase; and
    identifying the translation relationship between the source language phrase and candidate phrase based on the score.

2. The method of claim 1 wherein pairs comprise a word in the source unit and a word in the target unit having individual word association scores indicative of a degree of association between pairs of words in the source and target units.

3. The method of claim 2 wherein calculating a score comprises:
    calculating an inside score indicative of the degree of association between words in the source language phrase and words in the candidate phrase; and
    calculating an outside score indicative of the degree of association between words in the source unit outside the source language phrase and words in the target unit outside the candidate phrase.

4. The method of claim 3 wherein calculating a score comprises:
    combining the inside and outside scores to obtain a joint score.

5. The method of claim 4 wherein identifying the translation relationship comprises:
    identifying the translation relationship between the source language phrase and the candidate phrase based on the joint score.

6. The method of claim 2 wherein generating at least one candidate phrase comprises:
    generating the candidate phrase based on the individual word association scores.

7. The method of claim 5 wherein each word in the source unit has a word association indicative of a word in the target unit, including a null word, that is most strongly associated with it, and each word in the target unit has a word association indicative of a word in the source unit, including a null word, that is most strongly associated with it, and wherein receiving access comprises:
    generating counts of occurrences of most strongly associated word pairs.

8. The method of claim 5 and further comprising:
    detecting a capitalization pattern in the candidate phrase; and
    adjusting the joint score based on the capitalization pattern.

9. The method of claim 8 wherein detecting a capitalization pattern comprises detecting at least one of:
    a first pattern in which a first word in the candidate phrase begins with a capital letter;
    a second pattern in which the first word in the candidate phrase does not begin with a capital letter, but one or more subsequent words in the candidate phrase begin with a capital letter; and
    a third pattern in which no words in the candidate phrase begin with a capital letter.

10. The method of claim 9 wherein adjusting the joint score based on the capitalization pattern comprises:
    applying a first capitalization score when the first pattern is detected;
    applying a second capitalization score, when the second pattern is detected; and
    applying a third capitalization score, when the third pattern is detected.

11. The method of claim 3 wherein calculating an inside score comprises:
    identifying inside word pairs by:
        for each word in the source language phrase, identifying a word in the candidate phrase, including a null word, that is most closely associated with it based on the word association scores; and
        for each word in the candidate phrase, identifying a word in the source language phrase, including a null word, that is most closely associated with it based on the word association scores.

12. The method of claim 11 wherein calculating the inside score further comprises:
    for each inside word pair, generating an inside word pair probability indicative of a probability that an occurrence of one word in the inside word pair will have another word in the inside word pair as a most strongly associated word; and
    combining the inside word pair probabilities.

13. The method of claim 12 wherein calculating an outside score comprises:

identifying outside word pairs by:
for each word in the source unit, outside of the source language phrase, identifying a word in the target unit outside of the candidate phrase, including a null word, that is most closely associated with it based on the word association scores; and
for each word in the target unit outside of the candidate phrase, identifying a word in the source unit outside of the source language phrase, including a null word, that is most closely associated with it based on the word association scores.

14. The method of claim 13 wherein calculating the outside score further comprises:

for each outside word pair, generating an outside word pair probability indicative of a probability that an occurrence of one word in the outside word pair will have another word in the outside word pair as a most strongly associated word; and
combining the outside word pair probabilities.

15. The method of claim 14 wherein calculating the joint score comprises:

combining the inside and outside word pair probabilities.

16. The method of claim 1 wherein generating candidate phrases comprises:

identifying target language words in the target unit that are most strongly associated with a word in the source language phrase; and
identifying target language words in the target unit with which a word in the source language phrase is most strongly associated.

17. The method of claim 16 wherein generating candidate phrases further comprises:

generating candidate phrases as sequences of words in the target unit, constrained to those beginning and ending with an identified target language word.

18. The method of claim 17 wherein generating candidate phrases further comprises:

generating further candidate phrases that begin with a target language word beginning with a capital letter and end with an identified target language word.

19. The method of claim 5 wherein identifying the phrase translation relationship comprises:

modifying the joint scores associated with each candidate phrase based on how often throughout the corpus the candidate phrase is generated as a translation of the source language phrase based on the joint score for the candidate phrase to obtain a new joint score.

20. The method of claim 19 wherein modifying the joint score comprises:

generating counts of how often each source language phrase in the corpus is translated as a given candidate phrase based on the joint scores.

21. The method of claim 20 wherein modifying the joint score further comprises:

estimating a new inside score for each candidate phrase from the counts generated.

22. The method of claim 21 wherein modifying the joint score further comprises:

applying a scaling factor to the new inside score to obtain a scaled inside score.

23. The method of claim 22 wherein modifying the joint score further comprises:

combining the scaled inside score with the outside score for each candidate phrase to obtain the new joint score for each candidate phrase.

24. The method of claim 19 wherein identifying the phrase translation relationship comprises:

converting the new joint scores to a desired form by:
for each pair of units and each source language phrase, identifying a candidate phrase as a most likely translation of the source language phrase based on the new joint scores and assigning counts to the identified candidate phrases.

25. The method of claim 24 wherein converting comprises:

computing log-likelihood-ratio scores based on the new joint scores.

26. The method of claim 25 wherein converting further comprises:

for each unit pair, for each source language phrase, assigning counts to a best candidate phrase based on the log-likelihood-ratio scores.

27. The method of claim 26 wherein converting further comprises:

computing new log-likelihood-ratio scores based on the counts assigned.

28. The method of claim 27 wherein converting further comprises:

iterating on the steps of assigning counts and computing new log-likelihood ratio scores until the best candidate phrase stabilizes.

* * * * *